United States Patent
Lv et al.

(10) Patent No.: US 10,747,472 B2
(45) Date of Patent: Aug. 18, 2020

(54) METHOD, DEVICE, AND COMPUTER PROGRAM PRODUCT FOR OPERATION CONTROL IN STORAGE SYSTEM

(71) Applicant: EMC IP Holding Company LLC, Hopkinton, MA (US)

(72) Inventors: Shuo Lv, Beijing (CN); Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 16/227,708

(22) Filed: Dec. 20, 2018

(65) Prior Publication Data
US 2019/0332326 A1 Oct. 31, 2019

(30) Foreign Application Priority Data
Apr. 28, 2018 (CN) .......................... 2018 1 0400279

(51) Int. Cl.
*G06F 3/06* (2006.01)
(52) U.S. Cl.
CPC .......... *G06F 3/0659* (2013.01); *G06F 3/0604* (2013.01); *G06F 3/0625* (2013.01); *G06F 3/0653* (2013.01); *G06F 3/0673* (2013.01); *G06F 3/067* (2013.01)

(58) Field of Classification Search
None
See application file for complete search history.

(56) References Cited

U.S. PATENT DOCUMENTS

| 2013/0103956 A1* | 4/2013 | Murakami | ............ G06F 1/3206 713/300 |
| 2019/0129750 A1* | 5/2019 | Liu | ......................... G06F 3/061 |

* cited by examiner

*Primary Examiner* — Brian R Peugh
(74) *Attorney, Agent, or Firm* — BainwoodHuang

(57) ABSTRACT

Techniques perform operation control in a storage system. The techniques involve obtaining a performance parameter of the storage system. The performance parameter is associated with at least one of access response time and resource utilization of the storage system. The techniques further involve obtaining a target performance parameter. The target performance parameter indicates a desired value of the performance parameter. The techniques further involve: in response to the performance parameter exceeding a first threshold, determining a scheduling parameter based on the performance parameter and the target performance parameter. The scheduling parameter is used to control execution of background operations in the storage system. In accordance with at least some of the techniques, background operations in the storage system can be effectively controlled, so that the resource usage and input/output performance can be improved.

18 Claims, 8 Drawing Sheets

METHOD, DEVICE, AND COMPUTER PROGRAM PRODUCT FOR OPERATION CONTROL IN STORAGE SYSTEM

FIELD

Embodiments of the present disclosure relate to the field of data storage, and more specifically, to a method, device and computer program product for operation control in a storage system.

BACKGROUND

In a current storage system, there are different types of background operations, such as snapshots deletion, disk defragmentation, etc. When executing these background operations, e.g. deleting lots of snapshots, there is a big spike in input/output (I/O) response time and central processing unit (CPU) utilization. In general, it is a great challenge regarding how to make background operations not take up more system resources and dynamically adjust the system resources usages for background operations according to the available system resources and how to make background operations run faster and more smoothly.

Throttling background operations is easy on its own, but it is different to keep the I/O response time at a proper margin and not to impose unreasonable delays. In current implementation of the storage system, lots of efforts have been made with respect to the throttling of background operations, but there are still lots of spikes and jumps in the I/O response time and CPU utilization. Since there are too many throttling parameters and factors, existing methods cannot adapt to variable workload and complex application environment. A big spike in response time is totally unacceptable to response time sensitive applications (like bank transactions, etc.).

SUMMARY

Embodiments of the present disclosure provide a solution for operation control in a storage system.

In a first aspect of the present disclosure, there is provided a method of operation control in a storage system. The method includes obtaining a performance parameter of the storage system. The performance parameter is associated with at least one of access response time and a resource utilization of the storage system. The method further includes obtaining a target performance parameter. The target performance parameter indicates a desired value of the performance parameter. The method further includes: in response to the performance parameter exceeding a first threshold, determining a scheduling parameter based on the performance parameter and the target performance parameter. The scheduling parameter is used to control execution of background operations in the storage system.

In a second aspect of the present disclosure, there is provided a device for operation control in a storage system. The device includes a processor and a memory coupled to the processor, the memory having instructions stored thereon. The instructions, when executed by the processor, cause the device to perform acts including: obtaining a performance parameter of the storage system. The performance parameter is associated with at least one of access response time and a resource utilization of the storage system. The acts further include obtaining a target performance parameter. The target performance parameter indicates a desired value of the performance parameter. The acts further include: in response to the performance parameter exceeding a first threshold, determining a scheduling parameter based on the performance parameter and the target performance parameter. The scheduling parameter is used to control execution of background operations in the storage system.

In a third aspect of the present disclosure, there is provided a computer program product. The computer program product is tangibly stored on a computer readable medium and includes machine executable instructions which, when executed, cause a machine to perform the method according to the first aspect of the present disclosure.

In accordance with certain embodiments, determining the scheduling parameter includes generating (or identifying) a load control result which identifies (e.g., controls) an amount of loading on the storage system by a set of background services provided by the storage system based on the performance parameter and the target performance parameter. Suitable examples of such a load control result include sleep time which indicates an interval at which background operations are executed, a thread number which indicates the number of threads used for executing background operations, a snapshot truncation time window for throttling deletion of snapshots (e.g., an interval between each round of truncate operations), combinations thereof, and so on.

The Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the more detailed description of the example embodiments of the present disclosure with reference to the accompanying drawings, wherein the same reference sign generally refers to the like element in the example embodiments of the present disclosure.

DETAILED DESCRIPTION OF EMBODIMENTS

Figure 1:
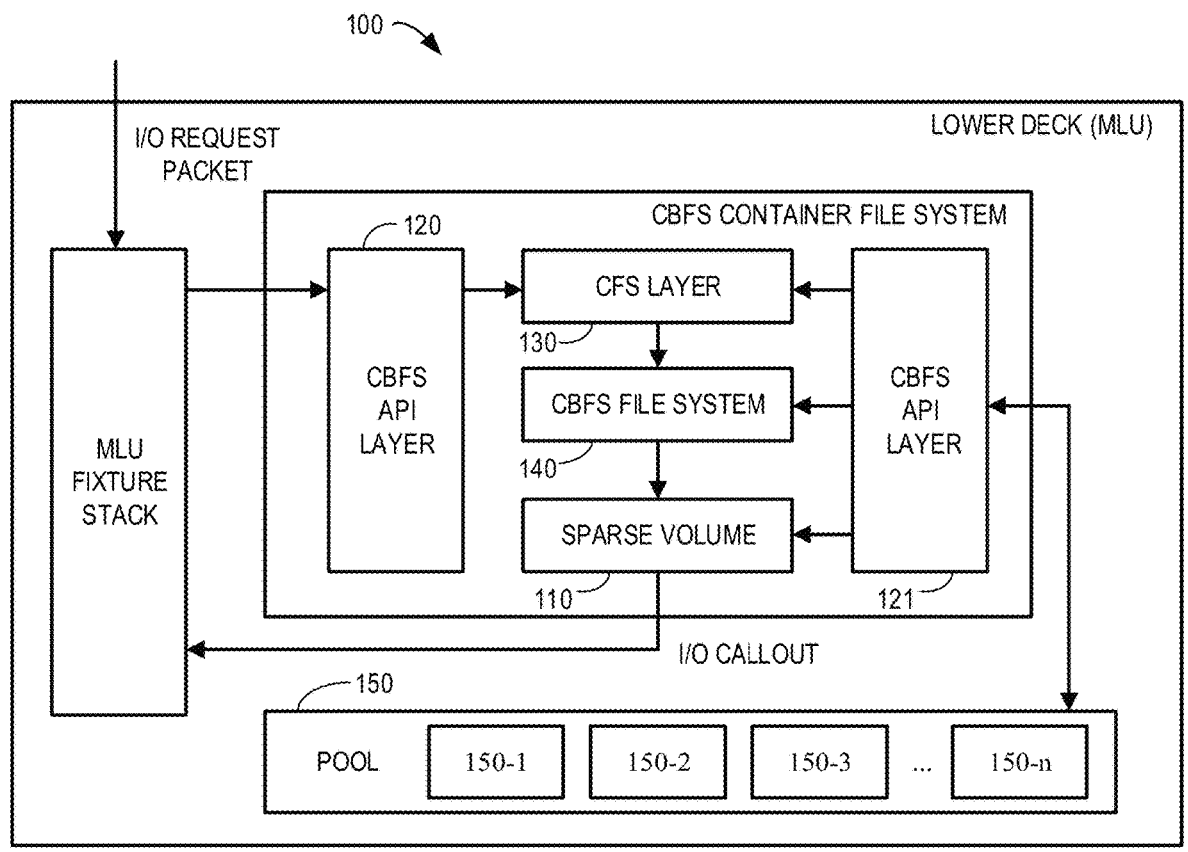
FIG. 1 shows a schematic diagram of a storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one further embodiment." The terms "first", "second" and so on can refer to same or different objects. Other definitions, either explicit or implicit, may be included below.

For the sake of explanation, some embodiments herein will take snapshots deletion as an example to illustrate a method or device for operation control in a storage system. However, as to be appreciated by those skilled in the art, embodiments of the present disclosure are not limited to snapshots deletion but may be applied to any background operation that has a similar problem.

FIG. 1 shows a schematic diagram of an example storage system 100 in which embodiments of the present disclosure may be implemented. However, it is to be noted that the structure of the storage system 100 as shown in FIG. 1 is merely by way of example and not intended for limiting the present disclosure. In some embodiments, embodiments of the present disclosure may be applied to other storage systems with an appropriate structure, and the specific structure of the storage system 100 as shown in FIG. 1 is not necessary.

In the example storage system 100 of FIG. 1, an up-layer file system (not shown) handles an input/output (I/O) request and sends it to a lower deck mapping logical unit (MLU) in the form of an I/O request packet. Common block file system (CBFS) application program interface (API) layers 120 and 121 execute file storage-related operations via a common file system (CFS) layer 130 and/or a CBFS layer 140. In addition, underlying data storage in the storage system 100 is supported by a storage resource pool 150. The storage resource pool 150 may include multiple storage devices, such as disks 151-1 to 151-N as shown in FIG. 1.

In the example storage system 100 as shown in FIG. 1, there are various background operations, such as snapshots deletion, disks defragmentation, etc. It is essential to dynamically adjust system resources for background operations, i.e. to throttle background operations.

Hereinafter, snapshots deletion is taken as an example to illustrate currently how background operations are throttled in the example storage system 100.

In current implementation, a throttle level for snapshots deletion is first determined on the basis of five factors of the storage system, and then the sleep time and the thread number for executing snapshots deletion are determined on the basis of the throttle level. The five factors are DataLog_percentage, UFSLog_perentage, a free percentage of the storage resource pool, I/O_ingestion_percentage, and readI/O_number_percentage. DataLog_percentage indicates the usage percentage of data logs (also combined with the file data cache (FDC) usage percentage); UFSLog_percentage indicates the usage percentage of file logs for a file system (also combined with system logs); the free percentage of the storage resource pool indicates the percentage of free space of the resource pool in which the file system is created; I/Oingestion_percentage indicates the percentage of the I/O load in this hour compared to the same time in last week; readI/O_number_percentage indicates the percentage of the number of read I/O between each round of the leafIB truncate (an operation of snapshots deletion) compared to the number of read I/O before the truncate operation starts.

The throttle level is determined as a function of the above five factors. The function may be expressed as, for example:

TLevel=f(DataLog_percentage, UFSLog_percentage,
the free percentage of the storage resource pool,
I/O_ingestion_percentage, ReadI/O_
number_percentage)

wherein TLevel represents a throttle level.

Then, based on the determined throttle level, the thread number corresponding to a certain throttle level is obtained from a predefined function gTruncateThrottleThread [TLevel], and the sleep time corresponding to the certain throttle level is obtained from a predefined function gTruncateThrottleSleepTime[TLevel]. The thread number and the sleep time are used to control the thread number and the time interval for the next round of Leaf truncate.

Inventors of the present invention have realized several problems in the existing solution. Since there are too many throttling parameters and factors, the existing solution only works under some workloads, and there are too many performance spikes in the system performance. Under some workloads, the throttling methods almost do not work, which gives rise to a burst of latency. In addition, the formula for determining a throttle level TLevel is too simple and cannot adapt to the workload of a real application. The current throttling solution is a coarse-grained adjustment and fails to make fine adjustment, which will cause large performance fluctuations. Moreover, calculation for throttling is too frequent and wastes too many CPU cycles.

According to embodiments of the present disclosure, there is provided a solution for operation control in a storage system, which can at least partially solve the problems in the prior art. This new adaptive solution can be used to throttle background operations, such as snapshots deletion, in the storage system. In this solution, the speed of background operations may be dynamically adjusted according to IO workloads of the storage system, and targets for performance parameters (e.g. access response time and resource utilization) are introduced to control the execution of background operations. In some embodiments, if the system I/O throughput exceeds a limit, then the background operation may sleep for a variable time (not fixed time), and the sleep time may be determined by I/O response time and target response time. For example, in the case of lower I/O throughput (corresponding to smaller I/O response time), background operations may take up more system resources; in case of higher I/O throughput (corresponding to greater I/O response time), background operations may take up less system resources. In some embodiments, the farther the performance parameter of the system from the target performance parameter, the greater the throttle extent of background operations, so as to reduce spikes in performance such as access response time and resource utilization. With the adaptive method disclosed in the present disclosure, the execution of background operations can be controlled effectively and smoothly with variable workloads, while reducing spikes in the I/O response time and the CPU utilization.

Figure 2:
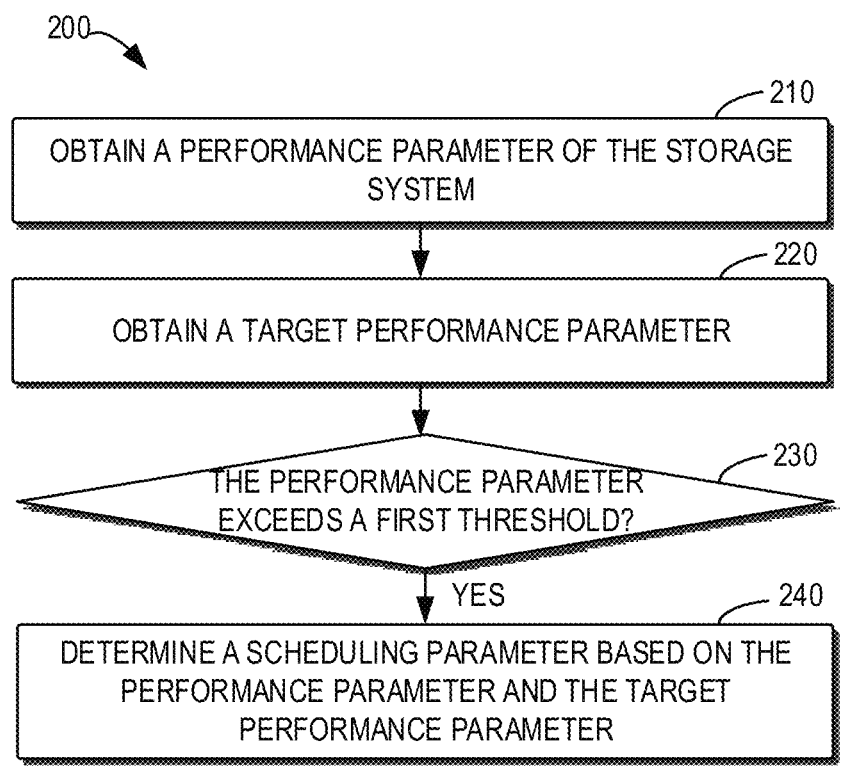
FIG. 2 shows a flowchart of an operation control process according to embodiments of the present disclosure.

Embodiments of the present disclosure will be described in detail with reference to FIGS. 2-7. FIG. 2 shows a flowchart of an operation control process 200 according to embodiments of the present disclosure. The process 200 may be implemented in the example storage system 100 as shown in FIG. 1, or may be implemented in any storage system with similar problems.

At 210, a performance parameter of the storage system is obtained, the performance parameter being associated with at least one of access response time and a resource utilization of the storage system. In some embodiments, the performance parameter may be I/O response time of the storage system. In some embodiments, the performance parameter may be a CPU utilization of the storage system.

At 220, a target performance parameter is obtained, the target performance parameter indicating a desired value of the performance parameter. In the above example of I/O response time, the target performance parameter may be a desired value for I/O response time, e.g. 8 ms. In the above example of CPU utilization, the target performance parameter may be a desired value for CPU utilization, e.g. 50%.

In some embodiments, the target performance parameter may be predetermined. For example, the target performance parameter may be preset by system developers or set by a user of the system. In some embodiments, the target performance parameter may be determined according to other parameter (see below).

Note that the above blocks 210 and 220 may be performed in a different order, i.e. the target performance parameter is first obtained and then the performance parameter of the current storage system is obtained. The scope of the present disclosure is not limited in this regard.

At 230, it is determined whether the performance parameter obtained at 210 exceeds a first threshold. The first threshold may be used to identify whether background operations such as snapshots deletion need to be throttled. If the performance parameter does not exceed the first threshold, it is indicated that the current workload of the system is relatively low, so background operations do not need to be throttled, i.e. background operations may operate in normal mode. In the above example of I/O response time, the first threshold may be, for example, 2 ms. In the above example of CPU utilization, the first threshold may be, for example, 20%.

If it is determined at 230 that the obtained performance parameter exceeds the first threshold, then the process proceeds to 240. At 240, a scheduling parameter is determined (e.g., generated) based on the performance parameter obtained at 210 and the target performance parameter obtained at 220. The scheduling parameter is used to control execution of background operations in the storage system. For example, the scheduling parameter may be sleep time, which indicates an interval at which background operations are executed. Alternatively or additionally, the scheduling parameter may be a thread number, which indicates the number of threads used for executing background operations. As an example only, when an embodiment according to the present invention is applied to the throttling of snapshots deletion, the scheduling parameter may be an interval between each round of truncate operations.

Note that the process 200 may be repeated at certain time intervals so that background operations may be dynamically controlled (e.g. throttled) based on real-time performance of the system. The certain time interval may be 1000 ms, 100 ms, 10 ms or 1 ms. In some embodiments, the certain time interval may be 200 ms. Repeating the process 200 at time intervals of 200 ms will not cause too long latency nor bring too much overhead to usage of system resources (e.g. usage of CPU).

Still referring to the block 220, in some embodiments, a second threshold may be obtained, and then the target performance parameter may be determined based on the first threshold and the second threshold. The second threshold may indicate an upper limit of the performance parameter. In the above example of I/O response time, the second threshold may be 20 ms for example. In the above example of CPU utilization, the second threshold may be 99% for example.

In some embodiments, the target performance parameter may be calculated based on the first threshold and the second threshold. Only as an example, an average of the first threshold and the second threshold may be used as the target performance parameter. In the above example of I/O response time, if the first threshold is 2 ms and the second threshold is 20 ms, then the target performance parameter may be 11 ms. In some embodiments, the target performance parameter may also be determined based on a predefined mapping rule.

In some embodiments, at the block 240, the scheduling parameter may be determined by introducing a control factor as an intermediate variable. For example, a control factor for the scheduling parameter may be determined based on the performance parameter obtained at the block 210, the target performance parameter obtained at the block 220 and the first threshold (or the second threshold). The control factor is associated with an extent to which background operations are adjusted. Then, the scheduling parameter may be determined based on the determined control factor. This process will be described below with reference to FIG. 3.

Figure 3:
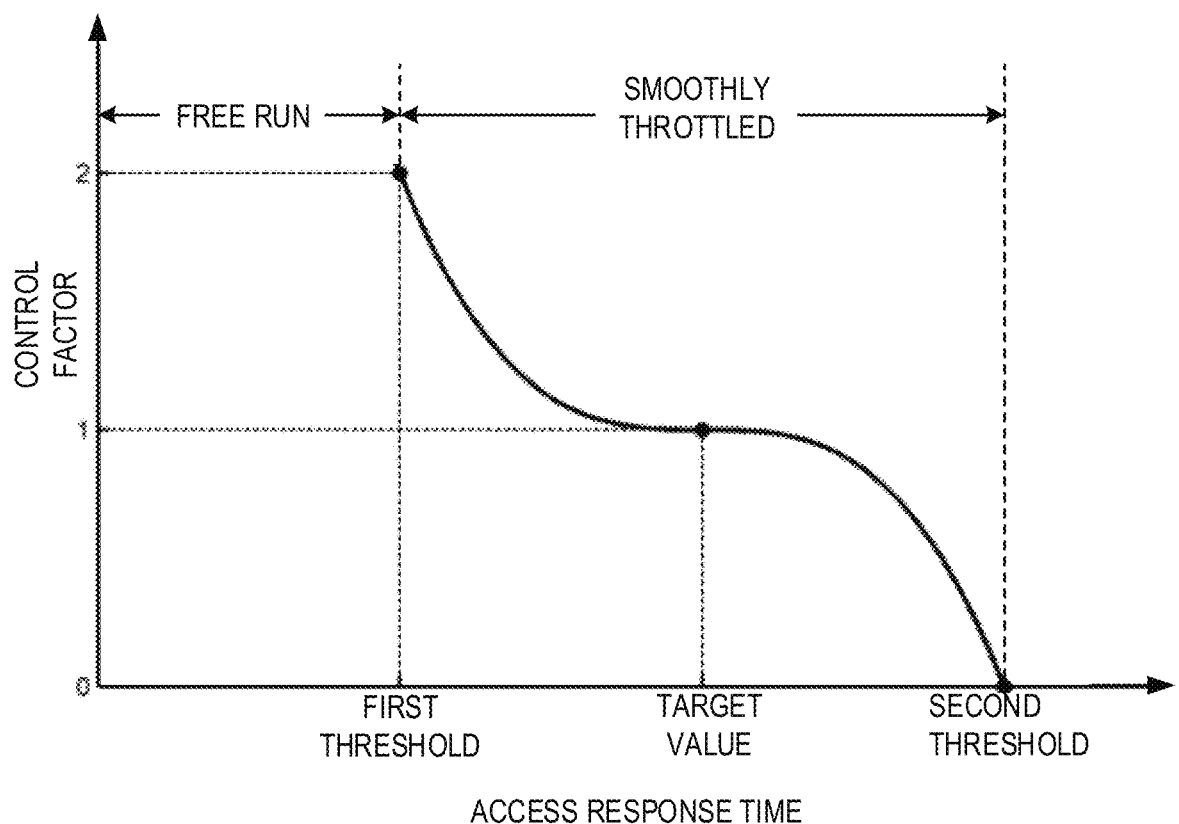
FIG. 3 shows a schematic diagram of a correspondence between a control factor and access response time according to some embodiments of the present disclosure.

For the sake of illustration, access response time will be taken as an example of the performance parameter to describe how to determine the scheduling parameter. However, those skilled in the art should understand that the performance parameter in the present disclosure is not limited to access response time. FIG. 3 shows a schematic diagram of a correspondence between a control factor and access response time according to some embodiments of the present disclosure.

In FIG. 3, a horizontal axis and a vertical axis represent access response time and a control factor respectively. As mentioned above, if the access response time is less than the first threshold, background operations do not need to be throttled. Accordingly, background operations in the storage system operate in a normal mode (as indicated by "free run" in FIG. 3). If the access response time exceeds the first threshold, the scheduling parameter for background operations needs to be adjusted so that background operations may be throttled smoothly (as indicated by "smoothly throttled" in FIG. 3).

A target value in FIG. 3 identifies that it is desired to balance the access response time around this value. Based thereon, a deviation between current access response time of the storage system and the target value (i.e. target response time) is first determined. When the obtained access response time is greater/less than the target value, the control factor will be decreased/increased so as to bring the access response time back to the target value. In some embodiments, a value of the control factor corresponding to the target value may be 1; for the access response time greater than the target value, a corresponding value of the control factor may be less than 1; for the access response time less than the target value, a corresponding value of the control factor may be greater than 1. For example, in the example of FIG. 3, a value of the control factor corresponding to the first threshold is 2, and a value of the control factor corresponding to the second threshold is 0.

In some embodiments, values of the control factor corresponding to different access response time may be calculated from a function. In the storage system, the access response time usually changes quickly as workloads change. As an example, the control factor may be determined from a $3^{rd}$ order polynomial like formula (1):

$$f(rt) = 1.0 + \left(\frac{tp - rt}{lt - tp}\right)^3 \quad (1)$$

wherein rt represents the access response time obtained at the block 210 in FIG. 2, tp represents the target value, and lt represents the second threshold. The function indicated by formula (1) subjects to:

| | |
|---|---|
| $f(fr)=2$, wherein $fr$ represents the first threshold; | condition (1): |
| $f(tp)=1$; | condition (2): |
| $f(lt)=0$; | condition (3): |
| $df/d(rt)<=0$; and | condition (4): |
| the closer $rt$ to $tp$, the smaller $\|df/d(rt)\|$, and vice versa. | condition (5): |

Condition (4) means that there is feedback control in such an embodiment. Condition (5) means that the greater deviations from the target value, the greater the extent to which background operations are adjusted. Therefore, the control factor determined in this way may reflect the extent to which background operations in the storage system need to be adjusted. Those skilled in the art should understand that formula (1) is merely an example, and the control factor may also be determined from other function with similar characteristics.

After determining the control factor, the scheduling parameter may be determined based on the determined control factor. For example, the scheduling parameter may be determined based on the control factor and a reference scheduling parameter, e.g. the scheduling parameter may be a value obtained by dividing the reference scheduling parameter by the control factor. As one example, when the scheduling parameter is sleep time for background operations, the sleep time may be determined from formula (2):

$$st = \frac{IOBW}{CF * TBW} \quad (2)$$

wherein st represents the sleep time, IOBW represents a statistical bandwidth for input/output, TBW represents a desired bandwidth, and CF represents the determined control factor. It should be understood that formula (2) is merely an example, and the scheduling parameter may be determined based on the control factor using other approaches in embodiments according to the present disclosure.

In the above specific examples, the sleep time is determined using formula (1) and formula (2). Due to the characteristics of the $3^{rd}$ order polynomial function, the sleep time determined as such can be effectively adjusted based on the access response time, so that the execution of background operations can be throttled smoothly.

The example in which the control factor is determined based on the performance parameter, the target performance parameter and the second threshold has been described above. Alternatively or additionally, in some embodiments, the control factor may also be determined based on the performance parameter, the target performance parameter and the first threshold. For example, in the above example in which the performance parameter is access response time, the control factor may be determined from a function like formula (3):

$$f(rt) = 1.0 + \left(\frac{tp - rt}{tp - fr}\right)^3 \quad (3)$$

wherein rt represents the access response time obtained at the block 210 in FIG. 2, tp represents the target value, and fr represents the first threshold.

Figure 4:
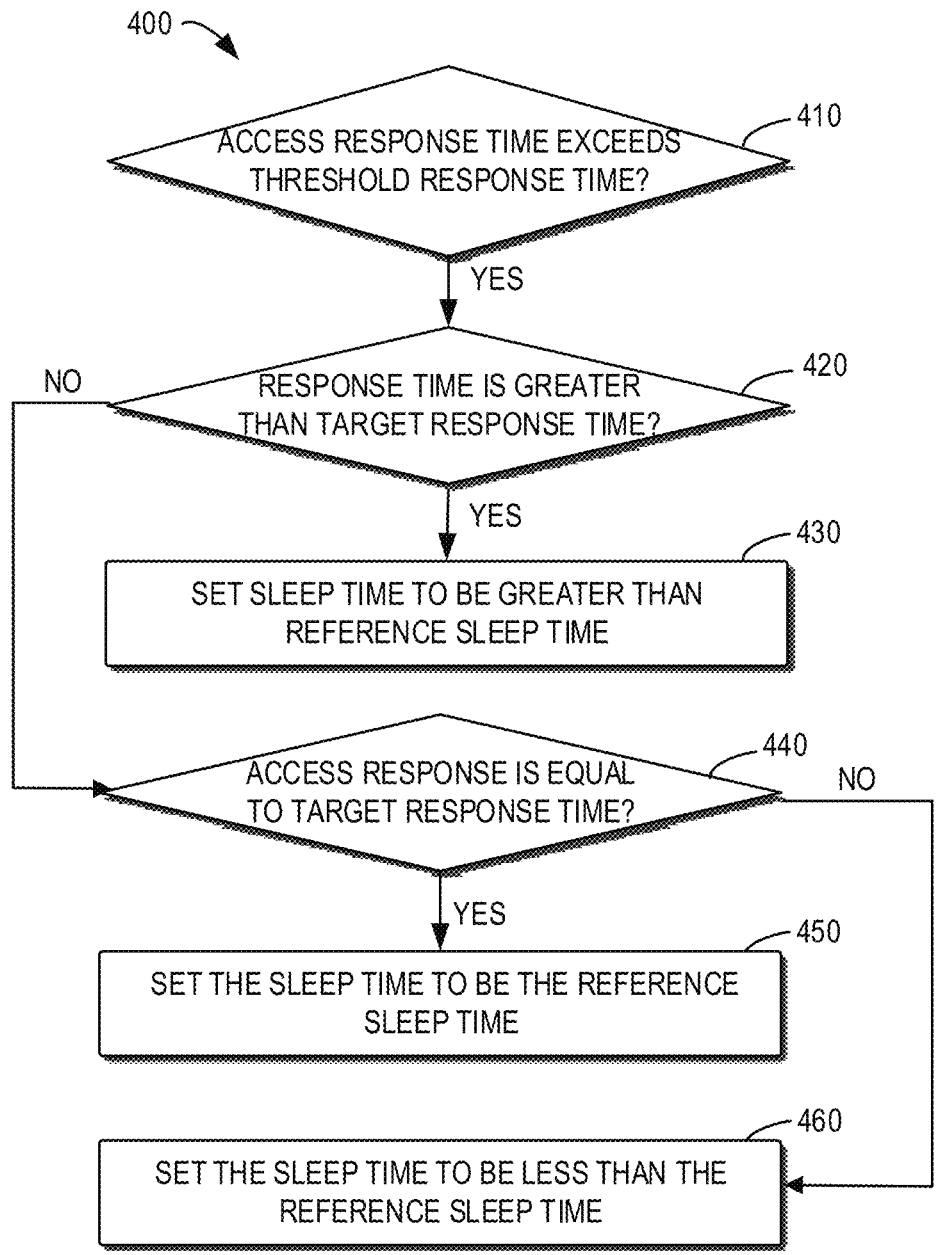
FIG. 4 shows a flowchart of a process for determining sleep time according to some embodiments of the present disclosure.
Figure 5:
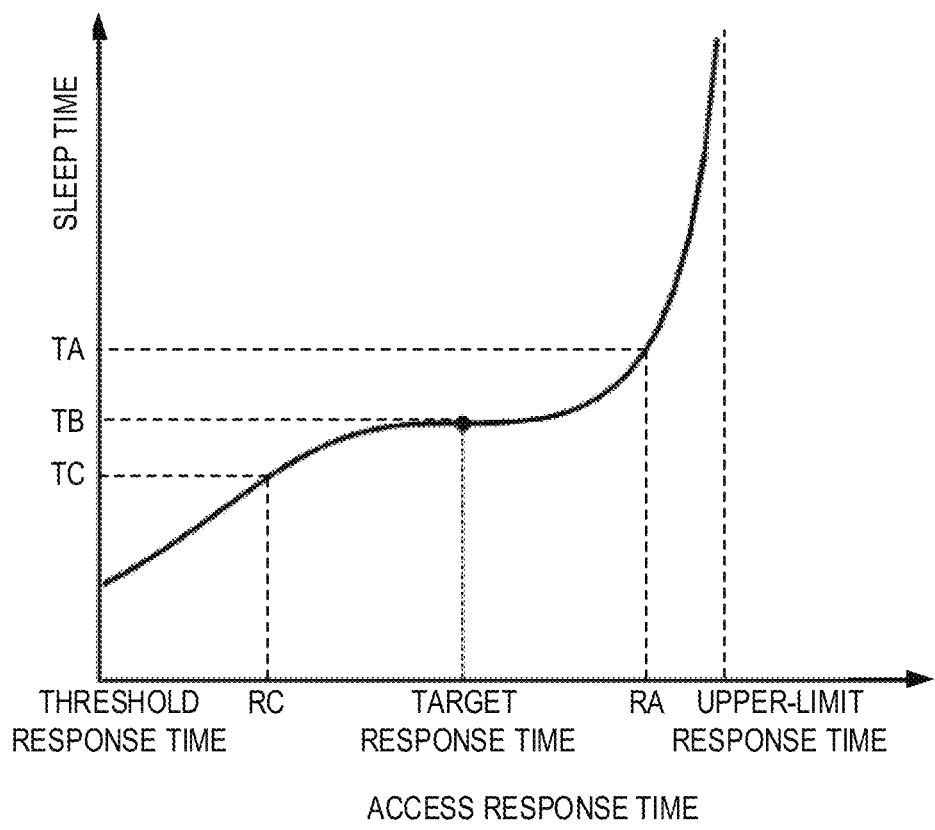
FIG. 5 shows a schematic diagram of a correspondence between sleep time and access response time according to some embodiments of the present disclosure.

Embodiments in which the scheduling parameter is determined by the control factor have been described above. However, it should be understood that the control factor is not necessary. In some embodiments, the scheduling parameter may be determined based on the performance parameter and the target performance parameter using a predetermined correspondence. Such embodiments are described with reference to FIGS. 4 and 5. FIG. 4 shows a flowchart of a process 400 for determining sleep time according to some embodiments of the present disclosure. The process 400 may be considered as a specific implementation of the blocks 230 and 240 in the process 200. FIG. 5 shows a schematic diagram of a correspondence between sleep time and access response time according to some embodiments of the present disclosure.

As an example, FIG. 4 shows a flowchart of a process 400 for determining sleep time for controlling background operations based on the obtained access response time. At 410, it is determined whether the obtained access response time (e.g., the access response time obtained at 210) exceeds threshold response time. If the access response time exceeds the threshold response time, then the obtained access response time may be compared with target response time, which indicates a desired value of the access response time of the system. The process proceeds to 420. At 420, it is determined whether the response time exceeds the target response time.

If the access response time is greater than the target response time, then the process proceeds to 430. At 430, sleep time is set to be greater than the reference sleep time.

The reference sleep time indicates sleep time corresponding to the target response time. With reference to FIG. 5, TB represents the reference sleep time. If a value of the obtained access response time is RA in FIG. 5, then the sleep time may be set to be a value TA which is greater than TB.

Still referring to FIG. 4, if the access response time is not greater than the target response time, then the process proceeds to 440. At 440, it is determined whether the response time is equal to the target response time. If the response time is equal to the target response time, then the process proceeds to 450. At 450, the sleep time is set to be the reference sleep time. For example, the sleep time may be set to be TB shown in FIG. 5.

If it is determined at 440 that the access response time is not equal to the target response time, then the process proceeds to 460. At 460, the sleep time is set to be less than the reference response time. For example, if a value of the obtained access response time is RC in FIG. 5, then the sleep time may be set to be a value TC which is less than TB.

Note the correspondence between the access response time and the sleep time as shown in FIG. 5 is merely by way of example. Such a correspondence may be calculated from a function such as formula (1) and formula (2). Those skilled in the art should understand that the correspondence between the access response time and the sleep time is not limited to that shown in FIG. 5.

In such embodiments, when the access response time is greater than the target response time, the sleep time for controlling background operations is greater than the reference sleep time. This means that the execution interval of background operations is increased and background operations are throttled to a greater extent, so that the access response time of the system is brought back to the target response time. When the access response time is less than the target response time, the sleep time for controlling background operations is less than the reference sleep time. This means that background operations are throttled to a smaller extent. In this way, the execution of background operations can be effectively adjusted without exerting a large impact on the access performance of the storage system, and spikes in the access response time can be reduced.

Table 1 and FIG. 6 show a comparison result of throttling snapshots deletion by using the adaptive method of the present disclosure and the prior art in the same test environment. In the test, sleep time for controlling the execution of snapshots deletion is determined based on access response time. As seen from Table 1, in the method of the present disclosure, the average response time and the average CPU utilization are both reduced as compared to the prior art.

TABLE 1

Comparison Between Prior Art and Method of Present Disclosure

| | Average Response Time (ms) | Average CPU Usage (%) |
|---|---|---|
| Prior Art | 3.82 | 85.50 |
| Method of the Present Disclosure | 3.65 | 82.10 |

Figure 6A:
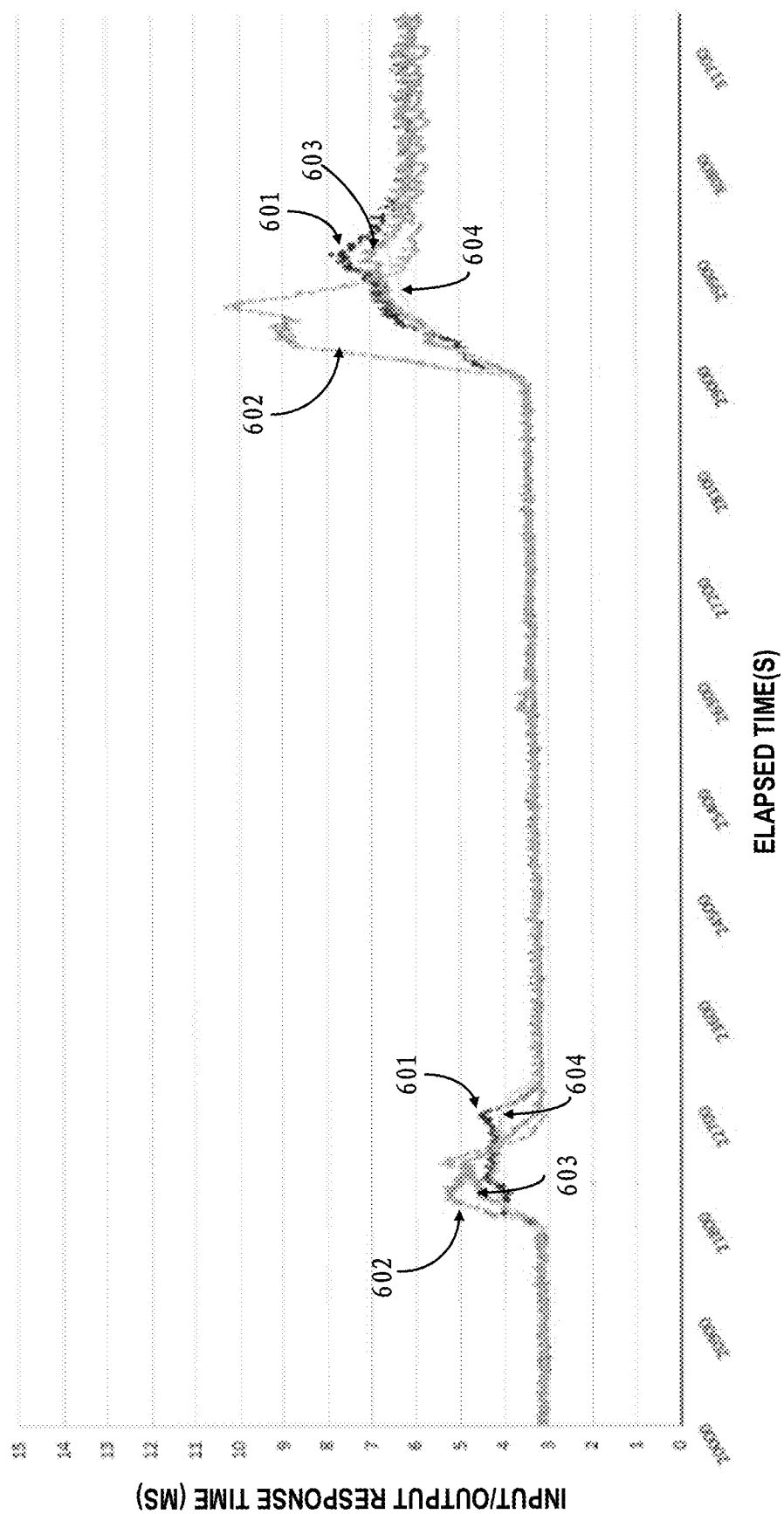
FIGS. 6A and 6B show graphs of input/output response time and CPU utilization as a function of time respectively.
Figure 6B:
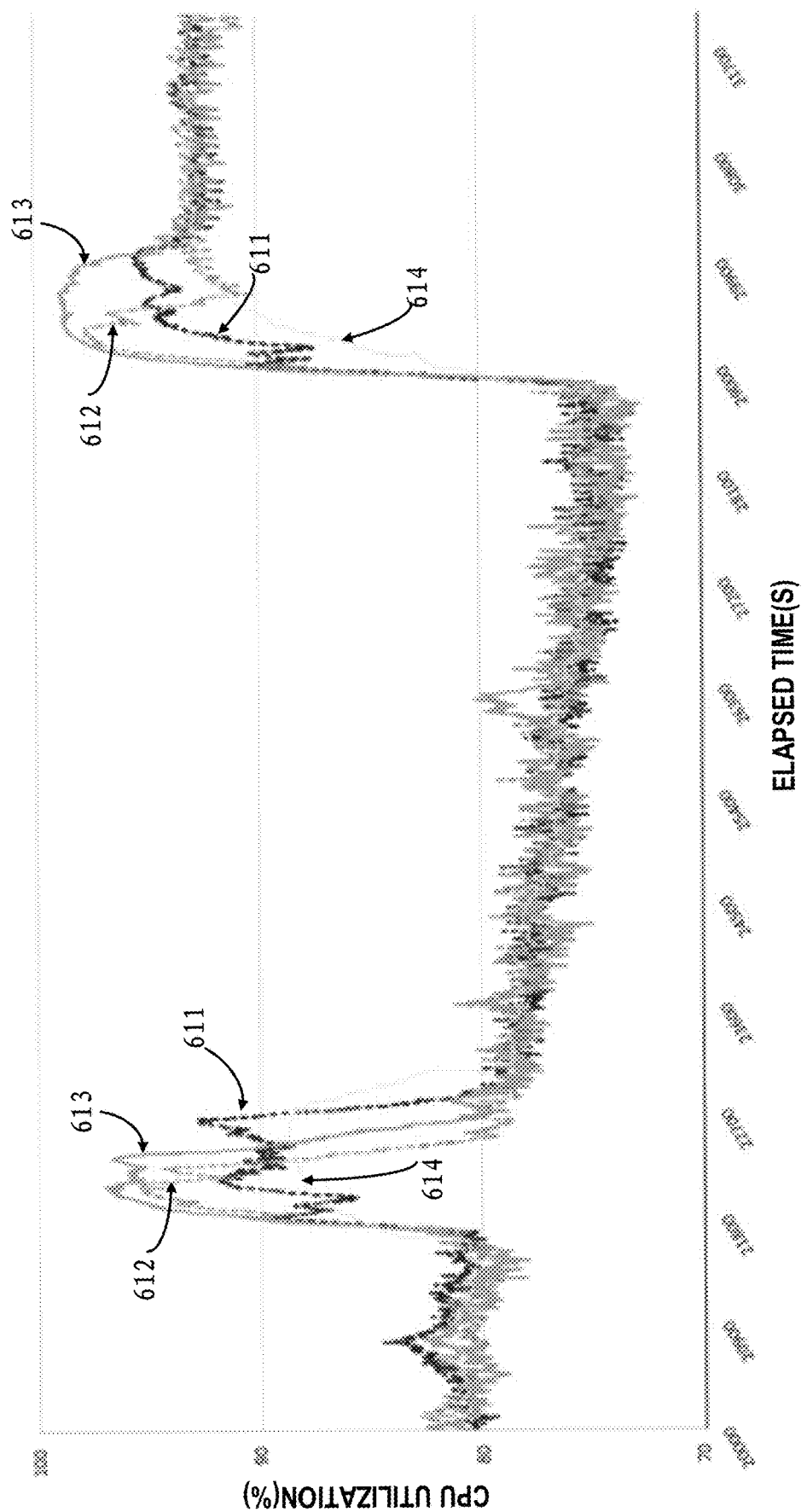

FIGS. 6A and 6B show input/output response time and CPU utilization as a function of time in a test respectively. In FIG. 6A, curves 601, 602, 603 and 604 indicate the change of input/output response time as time elapses by using the prior art, without being throttled, by using a baseline condition and the method of the present disclosure respectively. In FIG. 6B, curves 611, 612, 613 and 614 indicate the change of CPU utilization as time elapses by using the prior art, without being throttled, by using a baseline condition and the method of the present disclosure respectively.

As seen from FIGS. 6A and 6B, spikes in the curves 604 and 614 are significantly smaller than those in other curves. By means of the adaptive method of the present disclosure, the input/output response time curve and the CPU utilization curve are smoother, and the total truncate time keeps the same as compared to other methods. Such characteristics enable the storage system to adapt to variable workloads and complex application environments.

Embodiments in which the sleep time is determined based on the access response time have been described above. In some embodiments, the sleep time for controlling background operations may also be determined based on resource utilization (e.g. CPU utilization). This process is similar to that described with reference to FIGS. 4 and 5. First of all, it is determined whether the obtained resource utilization exceeds threshold utilization. If the obtained resource utilization exceeds the threshold utilization, then it is compared with target utilization. If the obtained resource utilization is greater than the target utilization, then the sleep time is set to be greater than the reference sleep time; if the obtained resource utilization is equal to the target utilization, then the sleep time is set to be the reference sleep time; if the obtained resource utilization is less than the target utilization, then the sleep time is set to be less than the reference sleep time.

In such embodiments, the execution of background operations can be throttled based on the resource utilization. In this way, the execution of background operations can be effectively adjusted, without significantly impacting resource usage of the storage system.

In some embodiments, a thread number for background operations may be determined based on the access response time. The thread number indicates the number of threads used for executing background operations. First of all, it is determined whether the obtained access response time exceeds threshold response time. If the obtained access response time exceeds the threshold response time, then it is compared with target response time. If the obtained access response time is greater than the target response time, then the thread number is set to be less than a reference thread number; if the obtained access response time is equal to the target response time, then the thread number is set to be the reference thread number; if the access response time is less than the target response time, then the thread number is set to be greater than the reference thread number. The reference thread number indicates the thread number corresponding to the target response time.

In such embodiments, when the access response time is greater than the target response time, the thread number for background operations is less than the reference thread number. This means that resources for background operations are reduced and background operations are throttled to a greater extent, so that the access response time of the system is brought back to the target response time. When the access response time is less than the target response time, the thread number for background operations is greater than the reference thread number, which means that background operations are throttled to a smaller extent. In this way, the execution of background operations can be effectively adjusted without significantly impacting access performance of the storage system, and spikes in the access response time can be reduced.

In some embodiments, the thread number for background operations may also be determined based on resource utilization. It is first determined whether the obtained resource utilization exceeds threshold utilization. If the obtained resource utilization exceeds the threshold utilization, then it is compared with target utilization. If the obtained resource utilization is greater than the target utilization, then the thread number is set to be less than a reference thread number; if the obtained resource utilization is equal to the target utilization, then the thread number is set to be the reference thread number; if the obtained resource utilization is less than the target utilization, then the thread number is set to be greater than the reference thread number.

In such embodiments, the execution of background operations can be throttled based on the resource utilization. In this way, the execution of background operations can be effectively adjusted without significantly impacting access performance of the storage system.

Figure 7:
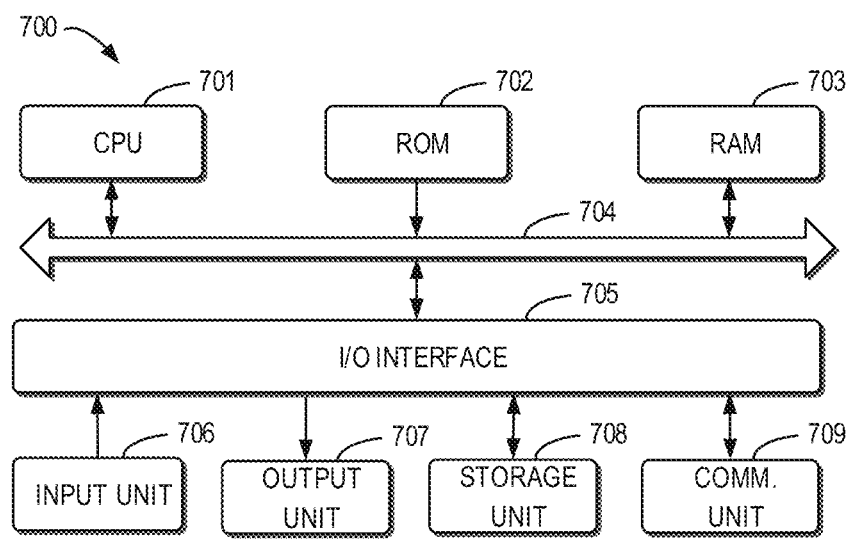
FIG. 7 shows a block diagram of an example device that can be used to implement embodiments of the present disclosure.

FIG. 7 is a schematic block diagram illustrating an example device 700 that can be used to implement embodiments of the present disclosure. The example storage system 100 shown in FIG. 1 may be implemented in the device 700. As illustrated, the device 700 includes a central processing unit (CPU) 701 which can perform various suitable acts and processing based on the computer program instructions stored in a read-only memory (ROM) 702 or computer program instructions loaded into a random access memory (RAM) 703 from a storage unit 708. The RAM 703 also stores various types of programs and data required by operating the storage device 700. CPU 701, ROM 702 and RAM 703 are connected to each other via a bus 704 to which an input/output (I/O) interface 705 is also connected.

Various components in the apparatus 700 are connected to the I/O interface 705, including: an input unit 706, such as a keyboard, mouse and the like; an output unit 707, such as a variety of types of displays, loudspeakers and the like; a storage unit 708, such as a magnetic disk, optical disk and the like; and a communication unit 709, such as a network card, modem, wireless communication transceiver and the like. The communication unit 709 enables the apparatus 700 to exchange information/data with other devices via a computer network such as Internet and/or a variety of telecommunication networks.

The processing unit 701 performs various methods and processes as described above, for example, any of the process 200 and the process 400. For example, in some embodiments, any of the process 200 and the process 400 may be implemented as a computer software program or computer program product, which is tangibly included in a machine-readable medium, such as the storage unit 708. In some embodiments, the computer program can be partially or fully loaded and/or installed to the device 700 via ROM 702 and/or the communication unit 709. When the computer program is loaded to RAM 703 and executed by CPU 701, one or more steps of any of the process 200 and the process 400 described above are implemented. Alternatively, in other embodiments, CPU 701 may be configured to implement any of the process 200 to the process 600 in any other suitable manner (for example, by means of a firmware).

According to some embodiments of the present disclosure, there is provided a computer readable medium. The computer readable medium is stored with a computer program which, when executed by a processor, performs the method according to the present disclosure.

Those skilled in the art would understand that various steps of the method of the disclosure above may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

I/We claim:

1. A method of operation control in a storage system, comprising:
   obtaining a performance parameter of the storage system, the performance parameter being associated with at least one of access response time and a resource utilization of the storage system;
   obtaining a target performance parameter, the target performance parameter indicating a desired value of the performance parameter; and
   in response to the performance parameter exceeding a first threshold, determining a scheduling parameter based on the performance parameter and the target performance parameter, the scheduling parameter being used to control execution of background operations in the storage system.

2. The method of claim 1, wherein obtaining the target performance parameter comprises:
   obtaining a second threshold, the second threshold indicating an upper limit of the performance parameter; and
   determining the target performance parameter based on the first threshold and the second threshold.

3. The method of claim 1, wherein determining the scheduling parameter comprises:
   determining a control factor for the scheduling parameter based on the performance parameter, the target performance parameter and the first threshold, the control factor being associated with an extent to which the background operations are adjusted; and
   determining the scheduling parameter based on the control factor.

4. The method of claim 1, wherein determining the scheduling parameter comprises:
   obtaining a second threshold, the second threshold indicating an upper limit of the performance parameter;
   determining a control factor for the scheduling parameter based on the performance parameter, the target performance parameter and the second threshold, the control factor being associated with an extent to which the background operations are adjusted; and determining the scheduling parameter based on the control factor.

5. The method of claim 1, wherein in response to the performance parameter exceeding the first threshold, determining the scheduling parameter based on the performance parameter and the target performance parameter comprises:

in response to the access response time exceeding threshold response time, comparing the access response time with target response time, in response to the access response time being greater than the target response time, setting sleep time to be greater than the reference sleep time, in response to the access response time being equal to the target response time, setting the sleep time to be the reference sleep time, and in response to the access response time being less than the target response time, setting the sleep time to be less than the reference sleep time, and wherein the sleep time indicates an interval between execution of the background operations, and the reference sleep time indicates sleep time corresponding to the target response time.

6. The method of claim 1, wherein in response to the performance parameter exceeding the first threshold, determining the scheduling parameter based on the performance parameter and the target performance parameter comprises:

in response to the resource utilization exceeding a threshold utilization, comparing the resource utilization with a target utilization, in response to the resource utilization being greater than the target utilization, setting sleep time to be greater than the reference sleep time, in response to the resource utilization being equal to the target utilization, setting the sleep time to be the reference sleep time, and in response to the resource utilization being less than the target utilization, setting the sleep time to be less than the reference sleep time, and wherein the sleep time indicates an interval between execution of the background operations, and the reference sleep time indicates sleep time corresponding to the target response time.

7. The method of claim 1, wherein in response to the performance parameter exceeding the first threshold, determining the scheduling parameter based on the performance parameter and the target performance parameter comprises:

in response to the access response time exceeding threshold response time, comparing the access response time with target response time, in response to the access response time being greater than the target response time, setting a thread number to be less than a reference thread number, in response to the access response time being equal to the target response time, setting the thread number to be the reference thread number, and in response to the access response time being less than the target response time, setting the thread number to be greater than the reference thread number, and wherein the thread number indicates a number of threads used for executing the background operations, and the reference thread number indicates a thread number corresponding to the target response time.

8. The method of claim 1, wherein in response to the performance parameter exceeding the first threshold, determining the scheduling parameter based on the performance parameter and the target performance parameter comprises:

in response to the resource utilization exceeding a threshold utilization, comparing the resource utilization with a target utilization, in response to the resource utilization being greater than the target utilization, setting a thread number to be less than a reference thread number, in response to the resource utilization being equal to the target utilization, setting the thread number to be the reference thread number, and in response to the resource utilization being less than the target utilization, setting the thread number to be greater than the reference thread number, and wherein the thread number indicates a number of threads used for executing the background operations, and the reference thread number indicates a thread number corresponding to the target response time.

9. A device for operation control in a storage system, comprising:

a processor; and a memory coupled to the processor, the memory having instructions stored thereon which, when executed by the processor, causing the device to perform acts comprising:

obtaining a performance parameter of the storage system, the performance parameter being associated with at least one of access response time and a resource utilization of the storage system, obtaining a target performance parameter, the target performance parameter indicating an desired value of the performance parameter, and in response to the performance parameter exceeding a first threshold, determining a scheduling parameter based on the performance parameter and the target performance parameter, the scheduling parameter being used to control execution of background operations in the storage system.

10. The device of claim 9, wherein obtaining the target performance parameter comprises:

obtaining a second threshold, the second threshold indicating an upper limit of the performance parameter; and determining the target performance parameter based on the first threshold and the second threshold.

11. The device of claim 9, wherein determining the scheduling parameter comprises:

determining a control factor for the scheduling parameter based on the performance parameter, the target performance parameter and the first threshold, the control factor being associated with an extent to which the background operations are adjusted; and determining the scheduling parameter based on the control factor.

12. The device of claim 9, wherein determining the scheduling parameter comprises:

obtaining a second threshold, the second threshold indicating an upper limit of the performance parameter;

determining a control factor for the scheduling parameter based on the performance parameter, the target performance parameter and the second threshold, the control factor being associated with an extent to which the background operations are adjusted; and determining the scheduling parameter based on the control factor.

13. The device of claim 9, wherein in response to the performance parameter exceeding the first threshold, determining the scheduling parameter based on the performance parameter and the target performance parameter comprises:
in response to the access response time exceeding threshold response time, comparing the access response time with target response time,
in response to the access response time being greater than the target response time, setting sleep time to be greater than the reference sleep time,
in response to the access response time being equal to the target response time, setting the sleep time to be the reference sleep time, and
in response to the access response time being less than the target response time, setting the sleep time to be less than the reference sleep time, and
wherein the sleep time indicates an interval between executions of the background operations, and the reference sleep time indicates sleep time corresponding to the target response time.

14. The device of claim 9, wherein in response to the performance parameter exceeding the first threshold, determining the scheduling parameter based on the performance parameter and the target performance parameter comprises:
in response to the resource utilization exceeding a threshold utilization, comparing the resource utilization with a target utilization,
in response to the resource utilization being greater than the target utilization, setting sleep time to be greater than the reference sleep time,
in response to the resource utilization being equal to the target utilization, setting the sleep time to be the reference sleep time, and
in response to the resource utilization being less than the target utilization, setting the sleep time to be less than the reference sleep time, and
wherein the sleep time indicates an interval between executions of the background operations, and the reference sleep time indicates sleep time corresponding to the target response time.

15. The device of claim 9, wherein in response to the performance parameter exceeding the first threshold, determining the scheduling parameter based on the performance parameter and the target performance parameter comprises:
in response to the access response time exceeding threshold response time, comparing the access response time with target response time,
in response to the access response time being greater than the target response time, setting a thread number to be less than a reference thread number,
in response to the access response time being equal to the target response time, setting the thread number to the reference thread number, and
in response to the access response time being less than the target response time, setting the thread number to be greater than the reference thread number, and
wherein the thread number indicates a number of threads used for executing the background operations, and the reference thread number indicates a thread number corresponding to the target response time.

16. The device of claim 9, wherein in response to the performance parameter exceeding the first threshold, determining the scheduling parameter based on the performance parameter and the target performance parameter comprises:
in response to the resource utilization exceeding a threshold utilization, comparing the resource utilization with a target utilization,
in response to the resource utilization being greater than the target utilization, setting a thread number to be less than a reference thread number,
in response to the resource utilization being equal to the target utilization, setting the thread number to be the reference thread number, and
in response to the resource utilization being less than the target utilization, setting the thread number to be greater than the reference thread number, and
wherein the thread number indicates a number of threads used for executing the background operations, and the reference thread number indicates a thread number corresponding to the target response time.

17. A computer program product having a non-transitory computer readable medium which stores a set of instructions for performing operation control in a storage system; the set of instructions, when carried out by computerized circuitry, causing the computerized circuitry to perform a method of:
obtaining a performance parameter of the storage system, the performance parameter being associated with at least one of access response time and a resource utilization of the storage system;
obtaining a target performance parameter, the target performance parameter indicating a desired value of the performance parameter; and
in response to the performance parameter exceeding a first threshold, determining a scheduling parameter based on the performance parameter and the target performance parameter, the scheduling parameter being used to control execution of background operations in the storage system.

18. The computer program product as in claim 17, wherein determining the scheduling parameter includes:
generating a load control result which identifies an amount of loading on the storage system by a set of background services provided by the storage system based on the performance parameter and the target performance parameter.

* * * * *